C. H. CRONK.
FOLDING CARRIER.
APPLICATION FILED NOV. 7, 1912.
1,085,670.
Patented Feb. 3, 1914.
2 SHEETS—SHEET 2.
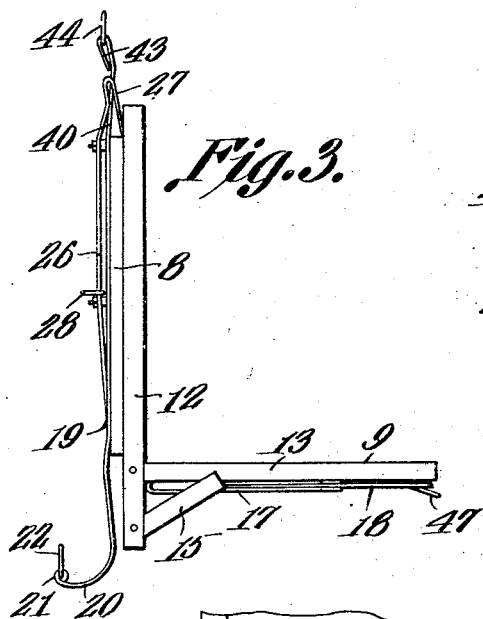
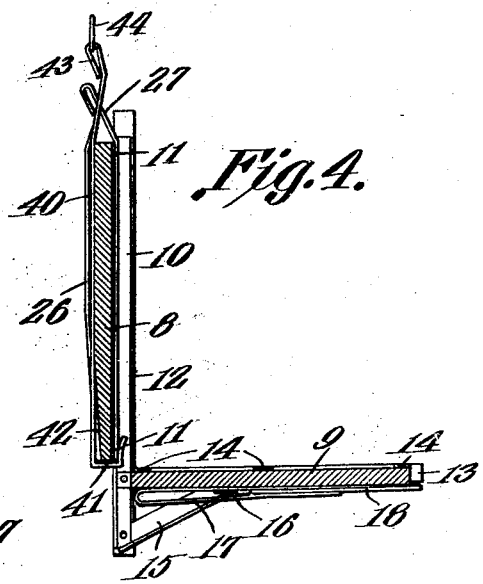
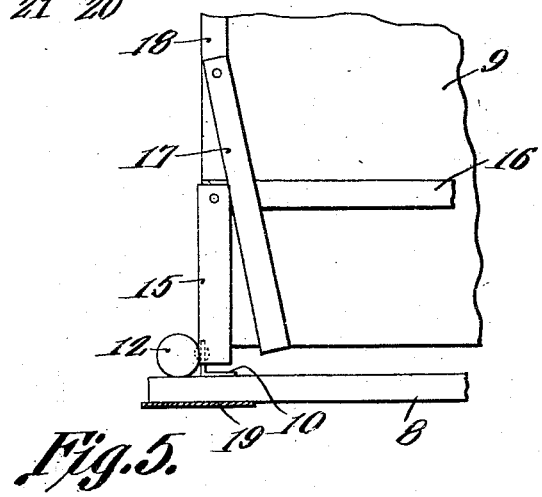
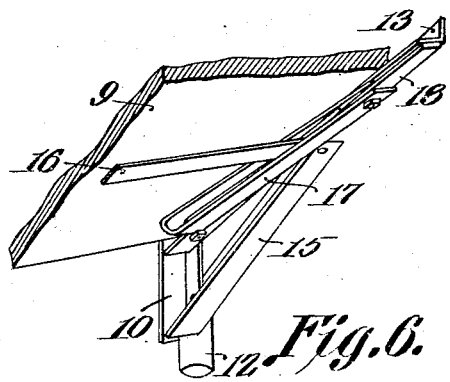
Witnesses
Charles H. Cronk,
Inventor
by C. A. Snow & Co.
Attorneys

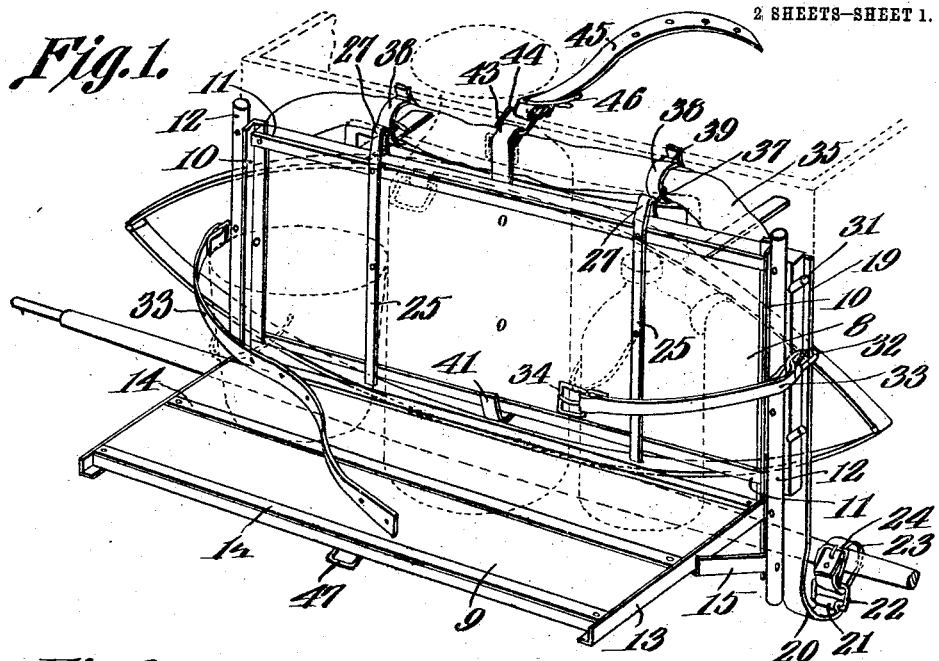
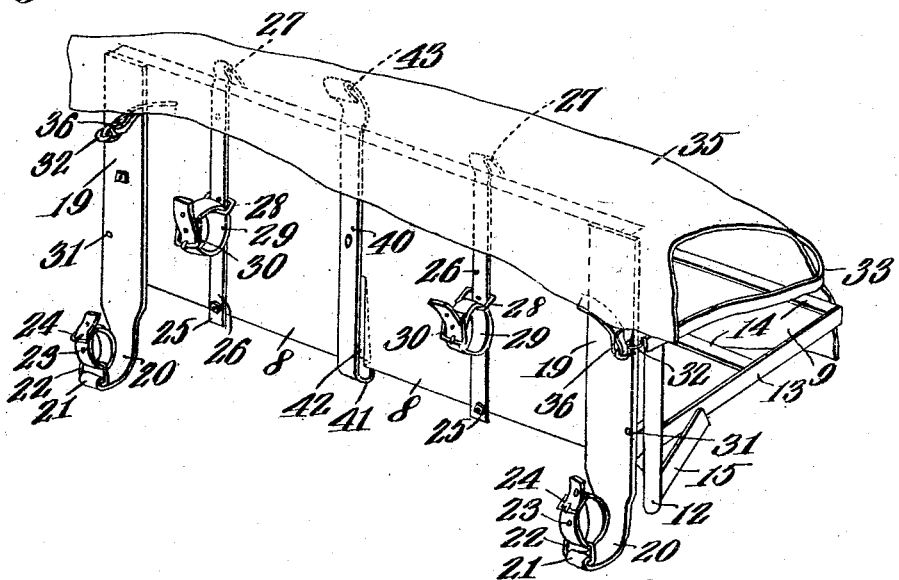

UNITED STATES PATENT OFFICE.

CHARLES H. CRONK, OF CURTIS, NEBRASKA.

FOLDING CARRIER.

1,085,670.  Specification of Letters Patent.  Patented Feb. 3, 1914.

Application filed November 7, 1912.  Serial No. 730,088.

*To all whom it may concern:*

Be it known that I, CHARLES H. CRONK, a citizen of the United States, residing at Curtis, in the county of Frontier and State of Nebraska, have invented a new and useful Folding Carrier, of which the following is a specification.

The present invention appertains to a folding carrier for vehicles, and aims to provide a carrier for luggage which is attachable or applicable to buggies, carriages, wagons, automobiles and sleighs.

The present invention also contemplates a carrier adapted to be supported at the rear end of the vehicle, or from the rear running gear, so that the carrier is yieldably supported by the axle and is slidably connected to the body of the vehicle or to the hanger securing the body to the spring carried by the axle.

Another object of the present invention is to provide a carrier constituting a back and a platform hinged thereto, means being provided for supporting the platform when swung downward.

A further object of the invention is to provide an apron carried by the back and which may be unfolded or opened so as to shield the luggage from exposure, either to the sun, rain, snow or other atmospheric conditions.

To the above and other ends, which will appear as the nature of the invention is further understood, the present invention resides in the combination and arrangement of parts and in the details of construction hereinafter described and claimed, it being understood that changes in the precise embodiment of invention herein disclosed can be made within the scope of what is claimed without departing from the spirit of the invention.

The invention has been illustrated in its preferred embodiment in the accompanying drawings, wherein similar reference characters have been employed to denote corresponding parts, and wherein:—

Figure 1 is a perspective view of the carrier as applied to a vehicle. Fig. 2 is a rear perspective view of the carrier. Fig. 3 is an end elevation of the device, parts being removed. Fig. 4 is a transverse sectional view, parts being removed. Fig. 5 is a fragmental bottom view, taken on an enlarged scale. Fig. 6 is a fragmental view in perspective of a detail.

Referring specifically to the drawings, the back of the carrier has been designated by the numeral 8, and the platform by the numeral 9, each of the said parts being preferably constructed from a suitable board or other material. The back and platform are rectangular in contour, and are of such a size as to accommodate the particular vehicle to which they are to be applied, it being understood that this device may be constructed in various sizes or proportions according to the whim of the user or other circumstances.

To the outer face of the back 8 are secured a pair of angle iron members 10, one adjacent each end, said members being arranged vertically and depending below the lower edge of the back. The flanges of the angle iron members 10 which are secured to the back project inwardly or toward each other, and strips 11 connect the said flanges and are secured to the back adjacent its upper and lower edges. Wooden or other members 12 are preferably secured to the back adjoining the free flanges of the angle iron members 10, and are coextensive with the angle iron members.

The platform 9 is hinged to the back 8 by means of a pair of angle iron members 13 secured to the ends of the platform, the inner ends of the members 13 being pivoted to the free flanges of the angle iron members 10. The angle iron members 13 protect the ends of the platform, the said members having one of their flanges secured directly over the ends of the platform and having their other flanges overlying the bottom face of the platform, a plurality of strips or cleats 14 being secured longitudinally on the upper face of the platform and having their ends preferably secured to the flanges of the angle iron members 13. The strips 14 are adapted to support the packages or luggage placed on the platform, and therefore protect the platform from wear.

The platform being hinged to the back adjacent the lower edge of the back is permitted to fold upward against the outer face of the back, and when lowered or unfolded to a horizontal position, is supported in such position by means of a pair of angle iron braces 15 pivoted to the lower ends of the angle iron members 10 below the platform 9, the free ends of the braces 15 being connected by a cross rod 16 working through a pair of looped guide bars 17 secured at their extremities to the platform with their bends projecting to the pivoted edge of the platform. The extremities of the looped guide bars 17 are secured to strips 18 secured to the lower flanges of the angle iron members 13, the said strips 18 terminating short of the inner edge of the platform, so that when the platform is lowered, the cross bar 16 will strike the inner end of the strips 18 to support the platform in a substantial manner. The lower ends of the angle iron members 10 are also so formed as to limit the downward movements of the braces 15 in order to assist in supporting the platform against depression due to the articles or luggage held thereon.

A pair of vertical plates 19 are secured to the inner face of the back adjacent the ends thereof, the said plates being secured at their upper ends to the back and having their lower ends free so as to provide leaf springs 20, the lower ends of the leaf springs being bowed or curved away from the plane of the back so as to extend under the axle of the vehicle. The free ends of the springs 20 are formed into eyes 21 through which the rings or loops 22 engage, straps 23 being passed through the rings 22 and having buckles 24. The straps 23 are designed to be looped about the body of the axle so as to secure the free ends of the springs to the axle, thus yieldably supporting the carrier from the axle in order that the luggage carried by the platform will not be jarred or jolted due to the vehicle traversing rough roads.

The back may be slidably connected to the hanger connecting the upper leaf of the elliptical spring carried by the axle and the body of the vehicle, so that the carrier will be held in position for vibratory movements relative to the elliptical spring and the body of the vehicle, this being accomplished in the following manner: A pair of metallic straps or strips 25, which are doubled, have the sections thereof secured over the two faces of the back so as to straddle the back, the inner sections 26 of the straps 25 being spaced from the inner face of the back and providing vertical guides. The bends 27 of the straps 25 are arranged about the upper edge of the back. Rings 28 are engaged to the guides 26 and are slidable vertically thereon, and through the rings are passed straps 29 including the buckles 30, so that the straps 29 may be looped around the hanger connecting the spring and vehicle body, the upper leaf of the elliptical spring, or any other suitable part of the vehicle, it being noted that the rings 28 in slidably engaging the guides 26, will permit the hanger, the upper leaf of the elliptical spring, or any other part of the vehicle, to vibrate relative to the back of the carrier. It will thus be noted that the carrier is yieldably supported from the axle, and is connected for vibratory movements to a part of the vehicle above the axle in order that the carrier will be properly maintained upon the rear end of the vehicle or on the running gear.

The outer edges of the plates 19 preferably extend beyond the ends of the back and are each provided with a series of apertures 31. A snap hook 32 is engageable through one aperture of each series, straps 33 being connected to the snap hooks and one of the straps having a buckle 34 to engage the free end of the other strap. These snaps 33 are adapted to be secured around the articles or luggage held on the platform to retain the same in position.

The apron has been designated by the numeral 35, the same being constructed of canvas or any other fabrics and having one end attached to the snap hooks 32 by means of the loops 36, or otherwise. This apron 35, when unfolded or unrolled, may be swung over the upper edge of the back and over the luggage in order to shield the luggage from exposure, the straps 33 being adapted to be secured over the apron and therefore holding the apron in position over the luggage as well as retaining the luggage against accidental displacement.

When the apron 35 is folded or rolled up, the same is adapted to be held in position, as illustrated in Fig. 1, by means of the rings or loops 37 engaging loops 27 and straps 38 passed through the rings 27 and embodying buckles 39, the straps 38 being adapted to be looped around the apron to retain same in rolled or folded position, in rear of the back.

For the purpose of effectively holding a milk can on the platform, the leaf spring 40 has been secured to the inner face of the back, the lower or free ends of the leaf spring depending from the back and being bent into a hook 41 projecting through the space or gap between the hinged edges of the back and platform. This hook 41 is adapted to engage the bottom chine of the milk can placed upon the platform 9 in order to hold the milk can from vibrating on the platform. The upper end of the leaf spring 40 is formed into an eye 43 above the upper edge of the back, a ring or loop 44 being connected to the eye 43 and a strap 45 being connected to the ring 44 and including a buckle 46. This strap 45 is adapted to be secured over the top of the milk can or around the neck thereof so as to retain the milk can upon the hook 41, and assisting the hook 41 in holding the milk can in position. The strap 45 is also employed for retaining the platform 9 in folded position, this strap being engageable through a ring or loop 47 carried by the free edge of the platform. It is also possible to employ the straps 38 for engaging the bails, handles or other parts of articles held upon the platform, if desired.

In view of the foregoing, taken in connection with the drawings, the advantages and capabilities of the present device will be manifest to those versed in the art, it being noted that the present device is applicable to various vehicles, and to the rear ends thereof, in order to be out of the way and so as not to encumber the ordinary use of the vehicle. The carrier is also yieldably supported so as to prevent the luggage carried thereby from being unduly jolted. It will also be evident that the objects aimed at have been carried out satisfactorily, and that the present device provides a desirable one for the purposes for which it is designed.

Having thus described the invention, what is claimed as new is:—

1. A carrier for vehicles embodying a back attachable to a vehicle, a platform hinged to the back, an apron attached to the inner side of the back and adapted to be opened over the back and platform, and straps attached to the ends of the back, and being adapted to be connected together over the luggage on the platform and over the apron.

2. A carrier for vehicles embodying a back attachable to a vehicle, a platform hinged to the back, an apron attached to the inner side of the back and adapted to be opened over the back and platform, straps attached to the ends of the back and being adapted to be connected together over the luggage on the platform and over the apron, and straps attached to the upper edge of the back and adapted to be looped around the apron when it is rolled up.

3. A carrier for vehicles embodying a back attachable to a vehicle, a platform hinged thereto, a leaf spring depending from the back on the inner face thereof and having a hook at its free end projecting between the platform and back for engaging the chine of a milk can placed on the platform, and means carried by the upper edge of the back for holding the top of the can.

4. A carrier for vehicles embodying a back attachable to a vehicle, vertical members secured to and depending from the back, a platform pivoted to the said members, looped guide bars secured at their extremities to the platform with their bends projecting to the pivoted edge of the platform, braces pivoted to the lower ends of the said members, and a cross piece connecting the free ends of the braces and passing through the said looped guide bars.

In testimony that I claim the foregoing as my own, I have hereto affixed my signature in the presence of two witnesses.

CHARLES H. CRONK.

Witnesses:
    J. E. Boas,
    F. E. Dillman.